United States Patent [19]

Hackman

[11] 3,771,384

[45] Nov. 13, 1973

[54] MECHANICAL TRANSMISSION DEVICE

[75] Inventor: Kenneth V. Hackman, Arcadia, Calif.

[73] Assignee: Southwest Products Co., Monrovia, Calif.

[22] Filed: Mar. 20, 1972

[21] Appl. No.: 235,917

[52] U.S. Cl. .................................. 74/505, 74/501 R
[51] Int. Cl. .............................................. F16c 1/18
[58] Field of Search ................ 74/501, 505; 287/78, 287/76, 75

[56] References Cited
UNITED STATES PATENTS

| | | | |
|---|---|---|---|
| 3,258,989 | 7/1966 | Frese et al. | 74/501 R |
| 2,531,614 | 11/1950 | De Pew | 74/501 R |
| 3,066,404 | 12/1962 | Jones | 287/75 X |
| 3,349,637 | 10/1967 | Moore | 74/501 R |
| 2,388,241 | 11/1945 | Arens | 74/501 R |
| 2,587,454 | 2/1952 | Fletcher et al. | 74/501 R |
| 2,890,595 | 6/1959 | Loeffler | 74/505 |

*Primary Examiner*—Charles J. Myhre
*Assistant Examiner*—F. D. Shoemaker
*Attorney*—Charles G. Lyon et al.

[57] ABSTRACT

A linear actuator incorporates a casing on which a crank is mounted. Rotation of the crank produces rotation of a gear which meshes with the inner portion of a rotatably mounted ring. A cable is attached to the outer periphery of the ring and extends through a series of nested balls which engage a grooved portion of an arcuate teflon strip. The other end of the cable is attached to a rod which is slidably mounted in a stationary tube. Rotation of the crank produces a linear movement of the rod.

8 Claims, 5 Drawing Figures

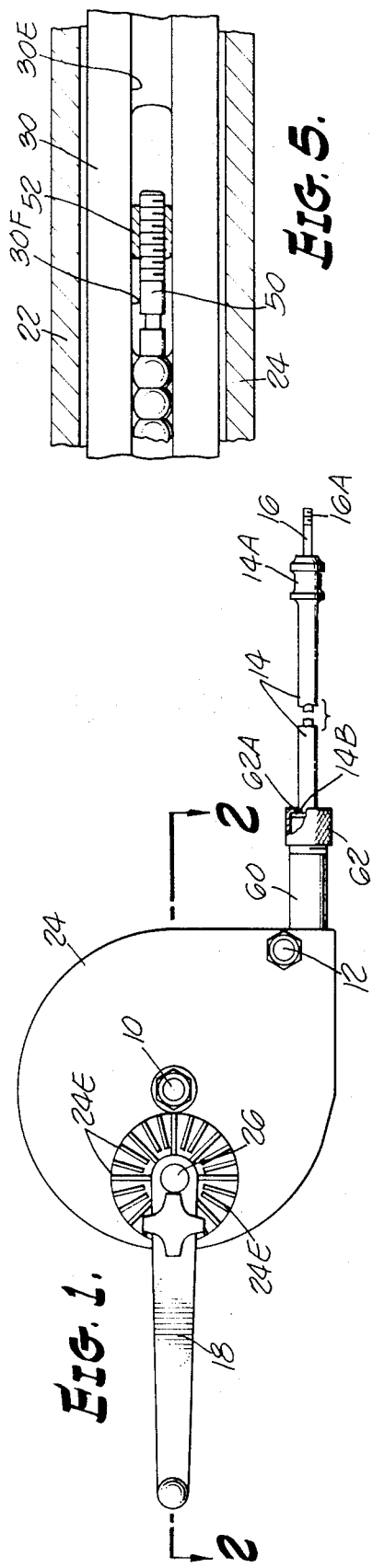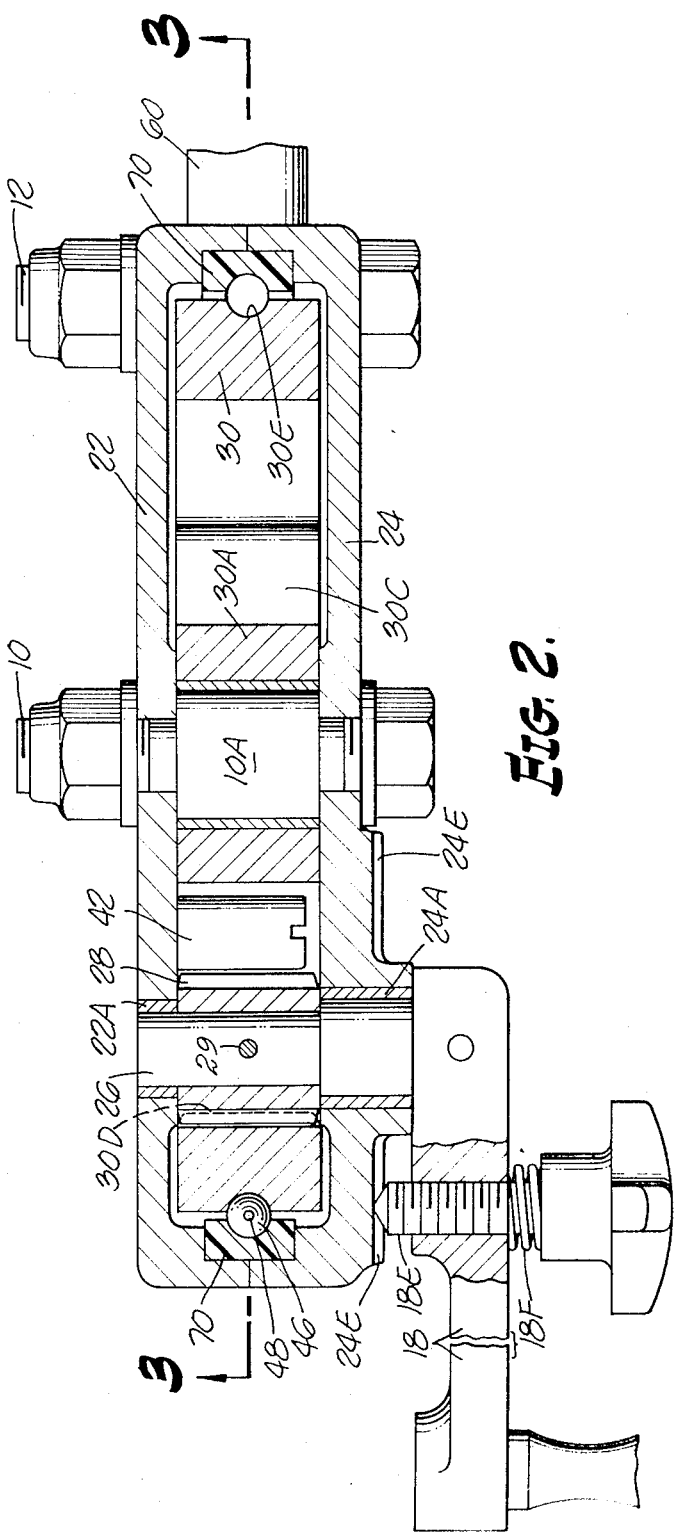

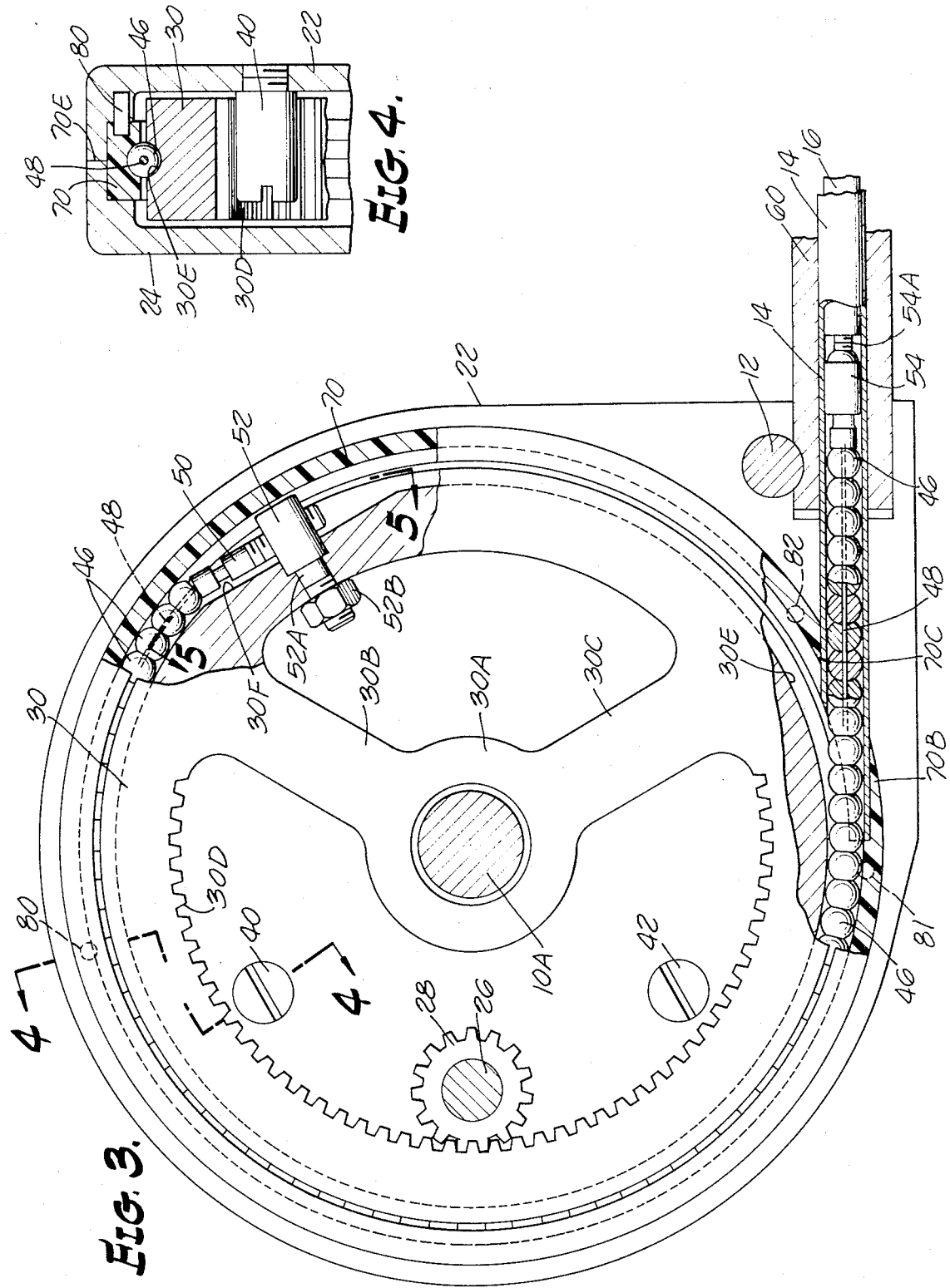

3,771,384

MECHANICAL TRANSMISSION DEVICE

The present invention relates to an improved linear actuator.

An object of the present invention is to provide an improved linear actuator in which linear movement of a rod is accomplished upon rotation of a crank.

Another object of the present invention is to provide a linear actuator using a cable extending through a series of nested balls with improved anti-friction means being provided for the balls to facilitate actuation and reduction of friction and for long life.

Another object of the present invention is to provide a linear actuator which is relatively simple in construction and which may be easily assembled and disassembled for manufacture, repair and replacement purposes.

Another object of the present invention is to provide a linear actuator capable of transmitting large amounts of force with a construction that is rugged, compact and easily operable.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 is a top plan view of a linear actuator embodying features of the present invention.

FIG. 2 is a sectional view taken substantially as indicated by the line 2—2 in FIG. 1.

FIG. 3 is a sectional view taken substantially as indicated by the line 3—3 in FIG. 2.

FIGS. 4 and 5 are sectional views taken substantially as indicated by the corresponding lines 4—4 and 5—5 in FIG. 3.

The actuator assembly is intended to be mounted on a stationary structure in three different locations, namely, at and by the bolt 10; at and by the bolt 12; and at and by the shouldered collar 14A on the heavy wall tube 14 through which the movable actuating rod 16 extends, this rod 16 having a threaded portion 16A for attachment to an element (not shown) to be actuated, i.e., moved, linearly in or out of the stationary tube 14 upon manual rotation of the crank 18 using a construction now described in detail.

The crank 18 is rotatably mounted on a two-part housing which includes a lower housing or casing member 22 cooperating with a complementary upper casing member 24. These casing halves 22, 24 have aligned bushings 22A, 24A through which the shaft 26 of crank 18 extends, such shaft 26 having secured thereto a gear 28 by means of pin 29. The casing halves 22, 24 are maintained together using the previously mentioned bolts 10, 12.

The bolt is of special construction and includes an intermediate enlarged portion 10A serving as a shaft for the hub portion 30A of a ring 30, such ring 30 being jointed to the hub portion 30A by two radially extending arms or spiders 30B, 30C, such ring 30 having a portion of its inner circumference formed with gear teeth 30D which mesh with the previously mentioned crank-driven gear 28. The limitation of movement of the ring 30 is established by stop pins 40, 42 which are secured as, for example, by screw threads to the base housing member 22. Stop 40 is engageable with the spider 30B in establishing one limit of movement, and the other stop post 42 is engageable with the other spider 30C to establish the other limit of movement of ring 30.

This ring 30 has its outer periphery formed with a circumferentially extending grooved portion 30E and also with a recessed portion 30F for reception and attachment thereto of a series of nested balls 46 through which a flexible cable 48 extends with one end of such cable 48 being secured to a threaded anchoring member 50, this member 50 being threaded in a nut 52 which has an integral portion 52A extending through an apertured portion of the ring 30 and being secured thereto by the nut 52B. The other end of the flexible cable 48 after passing through central apertured portions of all of the nested balls 46 is secured to a cylindrical element 54 which is slidably mounted in the heavy wall tube 14 and which has one of its ends threaded at 54A for threaded connection to the actuating rod 16.

The heavy wall tubing or sleeve 14 is stationarily secured to an outer sleeve 60 using, for example, a knurled nut 62 having an internal shoulder portion 62A engaging a flanged portion 14B of the inner sleeve 14. The outer sleeve 60, in turn, is secured to the casing halves 22, 24, by the bolt 12 which as seen in FIG. 3 extends through a notched portion of the outer sleeve 60.

An anti-friction element is incorporated in the assembly, and this involves flexible strip 70 of, for example, teflon material, such strip being disposed in a seat provided by the aligned undercut portions of the casing halves 22, 24, as seen in FIGS. 2 and 4. To facilitate assembly and establish position of the strip 70, three locating pins 80, 81, 82 (FIGS. 3 and 4) extend from the lower casing half 22 into apertured portions of the strip 70. One end of the strip at 70B terminates in a square shoulder, and the other end 70C terminates as a tapered end to provide clearance for the tube 14 which, as seen in FIG. 3, extends through the outer tube 60 and through the casing halves 22, 24 into close proximity to the ring 30.

The series of balls 46 may either be hollow or solid construction and may be of the character described in U.S. Pat. No. 2,441,719, issued May 14, 1948 to Lee R. Potter.

The upper casing half 24 as seen in FIG. 1 is formed with a series of radially extending notched portions 24E into one of which the conical end of a locking screw 18E may extend, this screw 18E being threaded in the handle 18 with a coil compresson spring 18F between the same for purposes of locking the crank 18 to the casing 24 in those cases where it is desired to prevent relative movement.

In operation of the assembly, the locking screw 18E is released to allow the handle 18 to rotate the gear 28. The gear 28 meshing at the gear portion 30 produces rotation of the ring 30 and one end of the flexible cable 48 attached thereto. The other end of flexible cable 48 is attached to the actuating rod 16 to produce linear movement of the same. Limits of movement are established at one end by engagement with the stop pin 40 by the spider 30B and on the other end upon engagement of the other stop 42 with the spider 30C.

The end of rod 16 is, of course, attached to the element to be actuated; and once its position is thus established, that position may be secured by tightening of the lock screw 18 which engages a grooved portion 24E of the casing 24. This movement is facilitated as a result of engagement of the series of balls 46 with the circumferentially grooved portion 70E of the teflon strip 70.

I claim:

1. A linear actuator including a casing; a first gear; means rotatably supporting said first gear on said casing; a second gear meshing with said first gear; means rotatably supporting said second gear on said casing; crank means secured to said second gear for rotating the same; flexible cable means having one of its ends secured to said first gear and extending partially around the same; a series of nested and apertured balls through each of which said cable means extends; guide means on said first gear into which the balls of said series closest to said one end partially extends for guiding thereby; a rod; means securing the other end of said cable means to said rod; sleeve means in which said rod slides; means securing said sleeve to said casing; said series of balls extending through said guide means and into said sleeve means; said first gear including an outer ring portion and an inner hub portion joined to said ring portion by spoke means; gear teeth on said inner portion of said ring portion meshing with said second gear; said flexible cable means being secured to said first gear using a threaded element screw-threaded into a nut; said nut having a shank portion extending through said ring portion; said ring portion having a portion of its outer surface recessed to receive said threaded element and said nut.

2. A linear actuator as set forth in claim 1 including stop means mounted on said casing and engageable with said spoke means to limit travel of said first gear.

3. A linear actuator as set forth in claim 1 in which said guide means is formed in the outer portion of said ring portion; and a flexible strip of anti-friction material, means maintaining said strip stationary on said casing; and said strip being formed with an annular grooved portion into which said series of balls extends for contacting therewith.

4. A linear actuator as set forth in claim 3 in which said casing includes two halves; an inner annular grooved portion defined by adjacent annular portions of said casing halves; said strip being disposed in said inner annular grooved portion; pin means extending from one of said casing halves into corresponding apertured portions of said strip.

5. A linear actuator as set forth in claim 4 in which said means securing said sleeve to said casing includes a bolt extending through said casing halves and through an outer notched portion of said sleeve means.

6. A linear actuator as set forth in claim 5 in which a second bolt extends through said casing halves about which said first gear rotates; said sleeve means being formed near one of its ends with an enlarged sleeve portion; said first bolt and said second bolt and said enlarged sleeve portion serving as means for securing the linear actuator on a stationary support.

7. A linear actuator as set forth in claim 2 in which said stop means includes a pair of posts mounted on and extending from said casing and engageable with a corresponding one of two spokes for joining said ring portion to said hub portion.

8. A linear actuator as set forth in claim 1 in which said flexible cable means has said other end thereof secured to a cylindrical element which is slidably mounted in said sleeve means; and cooperating screw-threaded portions between said cylindrical element and said rod for adjusting their relative positions.

* * * * *